(12) United States Patent
Cuffaro et al.

(10) Patent No.: US 6,587,686 B1
(45) Date of Patent: Jul. 1, 2003

(54) METHOD AND APPARATUS FOR DETECTING BASE STATION TRANSCEIVERS MALFUNCTIONS

(75) Inventors: Angelo Cuffaro, Pierrefonds (CA); Michel Desgagne, St-Hubert (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/459,941

(22) Filed: Dec. 14, 1999

(51) Int. Cl.[7] .................................................. H04Q 7/34
(52) U.S. Cl. ...................... 455/423; 455/424; 455/422; 455/8; 455/9; 370/242
(58) Field of Search .............................. 455/423, 422, 455/424, 67.1, 8, 9, 67.3, 574; 370/242

(56) References Cited

U.S. PATENT DOCUMENTS

| | | | |
|---|---|---|---|
| 5,263,175 A | 11/1993 | Dejmek | 455/10 |
| 5,394,459 A | 2/1995 | Djuphammar et al. | 379/15 |
| 5,752,165 A | 5/1998 | Hokkanen | 455/67.1 |
| 5,970,396 A | 10/1999 | Takashima | 455/135 |
| 6,002,928 A * | 12/1999 | Yoon et al. | 455/423 |
| 6,070,091 A * | 5/2000 | Hogevik | 455/561 |
| 6,223,031 B1 * | 4/2001 | Naslund | 455/423 |
| 6,223,032 B1 * | 4/2001 | Cuffaro | 455/425 |
| 6,298,233 B1 * | 10/2001 | Souissi et al. | 455/423 |
| 6,321,081 B1 * | 11/2001 | Lee | 455/422 |
| 6,339,705 B1 * | 1/2002 | Pehrson | 455/419 |
| 6,389,281 B1 * | 5/2002 | Lee | 455/423 |
| 6,418,317 B1 * | 7/2002 | Cuffaro et al. | 455/450 |
| 6,421,529 B1 * | 7/2002 | Wing et al. | 455/67.7 |
| 6,453,152 B1 * | 9/2002 | Hong et al. | 455/67.1 |
| 6,501,735 B1 * | 12/2002 | Han | 370/242 |

FOREIGN PATENT DOCUMENTS

| | | |
|---|---|---|
| EP | 0 434 921 A2 | 7/1991 |
| EP | 0 434 921 B1 | 7/1991 |
| EP | 0 434 921 B1 | 12/1994 |
| WO | WO 95/08876 | 3/1995 |
| WO | WO 96/31988 | 10/1996 |

OTHER PUBLICATIONS

Invitation to Pay Additional Fees (with Search), PCT/SE 00/02328; May 4, 2001.
International Search Report, PCT/SE 00/02328, dated Sep. 4, 2001.

* cited by examiner

*Primary Examiner*—Edward F. Urban
*Assistant Examiner*—Khawar Iqbal
(74) *Attorney, Agent, or Firm*—Alex Nicolaescu; Ericsson Canada Inc.

(57) ABSTRACT

The present invention is directed to method and apparatus for detecting base station (BS) transceivers malfunctions in a cellular telecommunications system. A Transceiver Malfunction Detector (TMD) receives and stores information related to the service performance of the BS transceivers and sorts the information on a per transceiver basis, for generating a service quality value for each transceiver. The TMD computes a service quality threshold value proportional to the average performance of the BS transceivers, and compares the service quality value of each monitored transceiver with the threshold, for determining the acceptability of the transceiver performance. The TMD also detects the cause of a malfunction in a transceiver, by assigning the frequencies used by an adequate transceiver to a transceiver suspected to be malfunctioning and by further monitoring the activity of the initially malfunctioning transceiver. When the transceiver persists malfunctioning after the frequency change, it is concluded that the malfunction is due to a hardware or software problem in the transceiver, while if the transceiver performance improves after the frequency change, it is concluded that the malfunction is due to a frequency interference.

18 Claims, 5 Drawing Sheets

METHOD AND APPARATUS FOR DETECTING BASE STATION TRANSCEIVERS MALFUNCTIONS

BACKGROUND OF THE INVENTION

1. Field of the Invention

The present invention relates to cellular telecommunication systems, more particularly to a method and apparatus for detecting malfunctions of base station transceivers in a cellular telecommunications network.

2. Description of the Prior Art

A cellular telecommunications network typically comprises a variety of dedicated nodes, each one performing a specific task. These nodes comprise, among other types of nodes, at least one Mobile Switching Center (MSC) communicating with at least one Home Location Register (HLR), and a plurality of Base Stations (BS). The MSC is the switching entity of the cellular telecommunications network that is responsible for establishing and controlling the communications between subscribers. The HLR is another dedicated node which typically comprises a subscribers profile database that includes subscriber related data, such as the current location of the subscriber, the allowed services for each subscriber, and possibly the billing data. Each BS is responsible for the radio communications between the subscribers' Mobile Stations (MS) and the cellular telecommunications network. Such a BS typically comprises at least one antenna, one base station controller, and a base station transceiver unit. The base station controller controls call set-up and the operation of the base station transceiver unit. The base station transceiver unit typically comprises a plurality of base station transceivers and each such transceiver handles actual radio transmissions, to and from a number of MSs, on selected radio frequencies. Typically, each BS transceiver has a number of assigned frequencies, or channels, that are used for establishing downlink and uplink transmissions with the MSs for communication or for signalling purposes.

In order to provide the best quality of radio service to cellular subscribers, the cellular operators have to regularly monitor the state of each BS transceiver. Radio transmission faults regularly occur and in many cases poor speech quality, poor system access, and poor reliability is due to transceiver malfunctions. However, it is the duty of the cellular operator to try to provide the best possible quality of service. Therefore, the industry has provided various methods for monitoring the state of the BSs, particularly the state of the BS transceivers which are directly responsible for the radio communication between the network and the cellular subscribers.

One of the most common methods involves periodic transmission of transceivers status information or alarms from the BS to the MSC which forwards this data to an Operation Support System (OSS) where the transceivers status information is stored in a database. Then, periodically, this data is manually checked and verified by network administrators. When an error is detected or suspected in a BS, technicians are typically sent on site in order to fix the problem.

However, this method is not well adapted to the needs of today's cellular telecommunications networks. The status of a BS transceiver can be ok, or the transceiver performance can be above an arbitrary threshold defined by the network administrators, but the transceiver can still provide poor performance, such as poor voice or data transmission quality. The means currently used for detecting the possible faults or malfunctions within the BS are not reliable since they only use arbitrary parameters and pre-defined thresholds to distinguish between the well functioning and the malfunctioning transceivers. Additionally, the human intervention in analysing the transceiver information leads to inconsistent and heterogeneous analysis.

By using arbitrary and human-defined thresholds for detecting when a transceiver becomes faulty, the current systems are not sufficiently reliable. Moreover, often times they do not take any action for correcting poor service provided by particular faulty transceivers. Alternatively, when a particular error affects a plurality of transceivers within the same BS or the same service area, the current systems detect that each one of these transceivers provides a service quality lower than the pre-defined threshold, and based on this information, the operators may turn off all the transceivers, which results in the total loss of cellular service.

It would be useful to have a method for automatically and adaptively detecting a transceiver malfunction based on transceiver information wherein the threshold for detecting a malfunctioning transceiver would depend on the current average quality of service of transceivers serving a selected service area, or a portion thereof, such as for example a cell. It would be also useful to have a method for automatically and consistently detecting a transceiver malfunction by sorting the transceiver state information received from one or more BSs, on a per transceiver basis in order to detect a malfunctioning transceiver based on a preselected function of transceiver-related parameters, and when such a potentially malfunctioning transceiver is detected, to confirm the malfunction, and suggest or take an action, such as turning off the particular malfunctioning transceiver.

SUMMARY OF THE INVENTION

It is therefore an object of the present invention to provide an adaptive method and corresponding apparatus for adaptively detecting a BS transceiver malfunction by comparing the performance of a particular monitored transceiver with threshold performance proportional to the average performance of a plurality of transceivers from the same service area, cell or portion thereof.

It is a further object of the present invention to provide a method and corresponding apparatus for detecting the source of the malfunction of a BS transceiver, once a possible malfunction is detected for that particular transceiver. Preferably, the method for detecting a BS transceiver malfunction and the method for confirming the malfunction are used in conjunction with each other for both detecting and confirming a base station transceiver malfunction.

According to a first preferred embodiment of the invention, there is provided a method for detecting malfunctions of base station transceivers, the method comprising the steps of:

a) sorting information relating to a plurality of base station transceivers on a per transceiver basis and generating a service quality value for each one of said plurality of base station transceivers, said service quality value being representative of a performance level of each one of said plurality of transceivers;

b) computing a service quality threshold value through a function generating a result proportional to an average performance level of said plurality of transceivers, using said information relating to said plurality of transceivers; and c) for at least one particular transceiver from said plurality of transceivers, comparing said service quality value with said service quality threshold value for determining the acceptability of said performance level of said particular transceiver.

According to a further embodiment of the invention, there is provided a method for confirming the source of a malfunction detected in a base station transceiver, the method comprising the steps of:

detecting a first transceiver suspected to be malfunctioning, said first transceiver having assigned a first set of frequency channels;

selecting a second transceiver having assigned a second set of frequency channels, said second transceiver appearing to be properly functioning;

assigning the second set of frequency channels to the first transceiver; and detecting if the first transceiver persists malfunctioning, whereby when the first transceiver persists malfunctioning the most probable cause of the malfunction is one of a hardware problem and a software problem, and when the first transceiver stops malfunctioning the most probable cause of the malfunction is a frequency interference.

According to yet another further embodiment of the invention, there is provided a transceiver malfunction detector for detecting malfunctions occurring in transceivers of at least one base station of said system, said transceiver malfunction detector comprising:

at least one database for storing information relating to a service performance of a plurality of base station transceivers;

means for generating a service quality value for each one of said plurality of transceivers by sorting said information on a per transceiver basis, each said service quality value being representative of a performance level of one transceiver;

means for generating a service quality threshold value proportional to an average of the service quality values of said plurality of transceivers; and means for comparing said service quality value of at least one transceiver from said plurality of transceivers with said service quality threshold value for determining the acceptability of said performance level of said at least one transceiver.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1A:
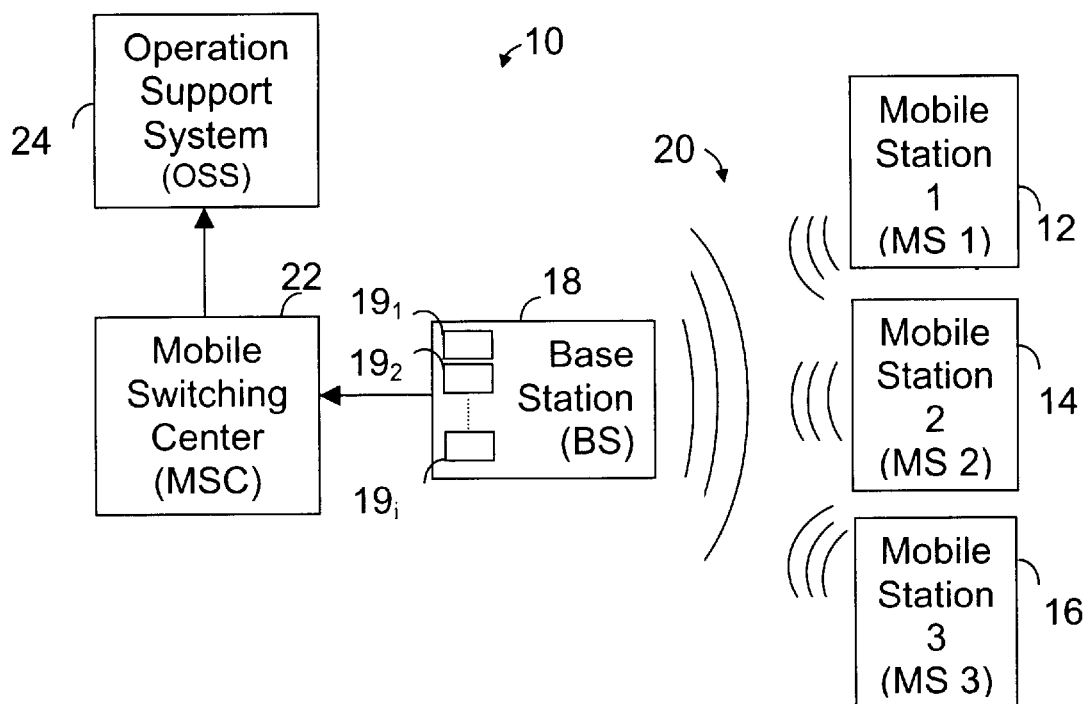
FIG. 1a is a top level block diagram of a cellular telecommunications network according to the typical prior art implementation for acquiring transceiver status data from a base station.

Reference is now made to FIG. 1a, which describes a top level block diagram of a typical prior art implementation of a cellular telecommunications network 10 for acquiring transceiver status data from one or more BSs. Typically, a plurality of MSs 12, 14, and 16 sustain communications with a BS 18, through a radio air interface 20. During these communications, measurements are made over both a downlink and an uplink radio paths in order to assess the quality of the ongoing communications. Typically, the measurements are directed but not limited to the Bit-Error-Rate (BER), the Frame Erasure Rate (FER) and the signal strength. Other communication parameters are also being computed such as the rate of dropped calls, the number or the rate of handoff failures, the number or the rate of call set-up failures and the call set-up time. All the above-mentioned parameters and measurements may be used in order to calculate the performance status of the components of the cellular telecommunications network. More particularly, in the current implementations of the cellular telecommunications network 10, they are used for assessing the performance level of the communications handled by each one of the transceivers 19$i$ of the BS 18. According to these existing implementations, each such transceiver 19$i$ individually calculates its own level of performance using the mentioned measurements and parameters, compare that level of performance with a pre-defined service quality threshold, and in case the intended minimum service quality is not satisfied, issues an alarm.

In a typical cellular telecommunications network 10, the alarms generated by the BS transceivers 19$i$ are typically sent from the BS 18 to the corresponding MSC 22 in the form of raw data, which is further forwarded from the MSC 22 to a cooperating Operating Support System (OSS) 24. The OSS 24 typically comprises a database where the incoming alarms received from the base stations located within the service area controlled by the MSC 22, are stored.

Figure 1B:
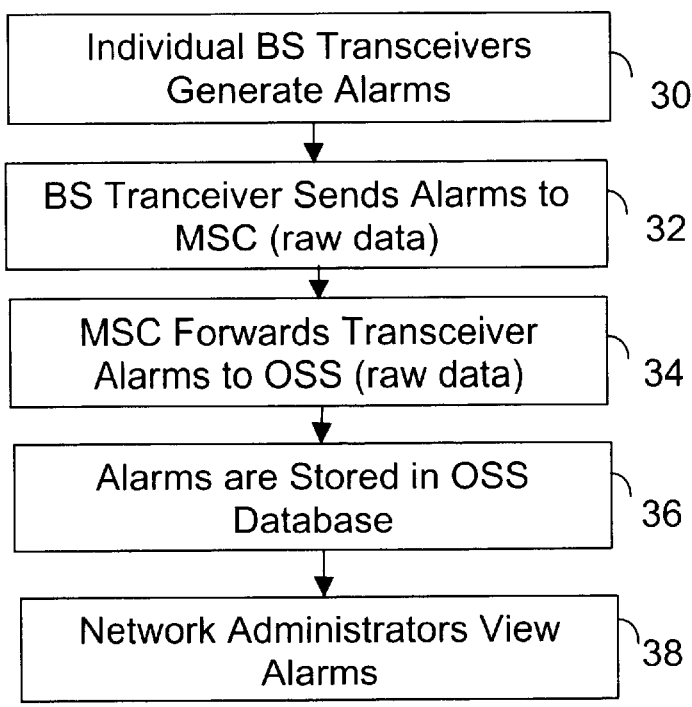
FIG. 1b is a flowchart illustrating the prior art method for transmitting and treating the transceiver status data.

Reference is now made to FIG. 1b which illustrates the flowchart corresponding to a typical known prior art method for detecting a faulty BS transceiver, in conjunction with FIG. 1a. First, in action 30, each base station transceiver 19$i$ generates its own transceiver performance data on the basis of the measured parameters, compares it with a pre-defined service quality threshold, and issues an alarm in case its actual service quality is lower than the pre-defined threshold. Then, the BS 18, transmits the transceiver alarms to the MSC 22, action 32, which in turn forwards the alarms to the OSS 24, action 34. Upon receipt of the transceiver alarms, the OSS 24 stores them into the OSS alarms database (not shown), action 36. Once the transceiver alarms are stored in the OSS database, they are accessible for network administrators who can use them for finding faulty transceivers (action 38), and send technicians in the field for repairing those transceivers.

Figure 2:
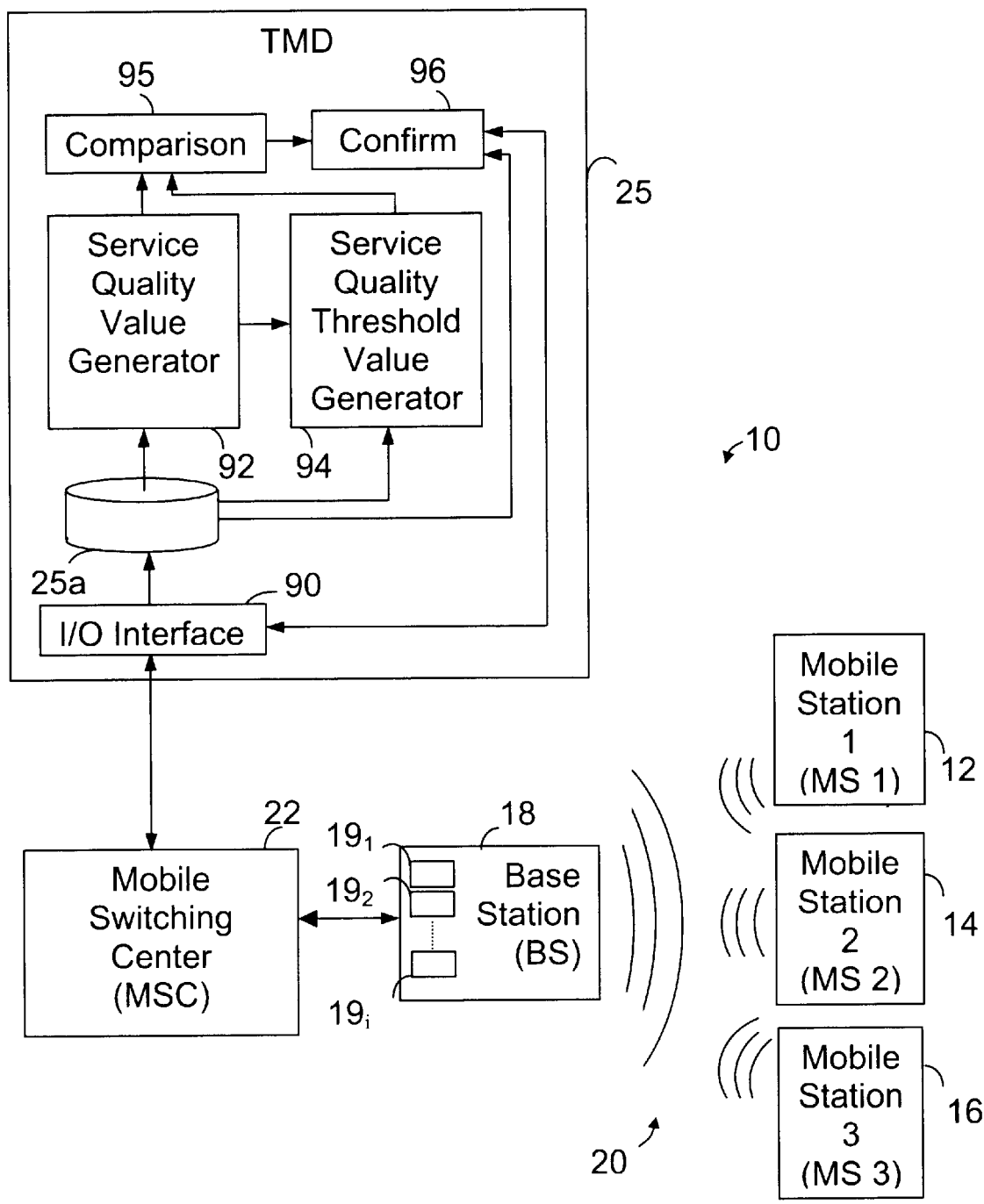
FIG. 2 is a top level block diagram of an exemplary implementation in accordance with a preferred embodiment of the present invention within the cellular telecommunications network.

Reference is now made to FIG. 2, wherein there is shown the actual exemplary implementation of the preferred embodiment of the present invention. The MSs 12, 14, and 16 sustain communications with the BS 18 as it is well known in the art. During these communications, the same measurements are taken and the same parameters are calculated within the BS transceivers 19i, as described hereinbefore. However, instead of sending alarms, the transceivers 19i send the measurements and parameters toward the MSC 22, which in turn forwards them to a Transceiver Malfunction Detector (TMD) 25 for storage in a TMD database 25a. The TMD 25 may be a stand-alone node within the cellular telecommunications network 10 as shown in FIG. 2, or may be a logic entity located within the MSC 22, or within any other node of the cellular telecommunications network 10. The function of the TXD 25 is to store and process the measurements and parameters generated by the BS transceivers 19i, in order to detect possible malfunctions of particular transceivers based on an adaptive threshold computed by the TMD 25, and related to the average quality of a plurality of transceivers 19i.

Figure 3:
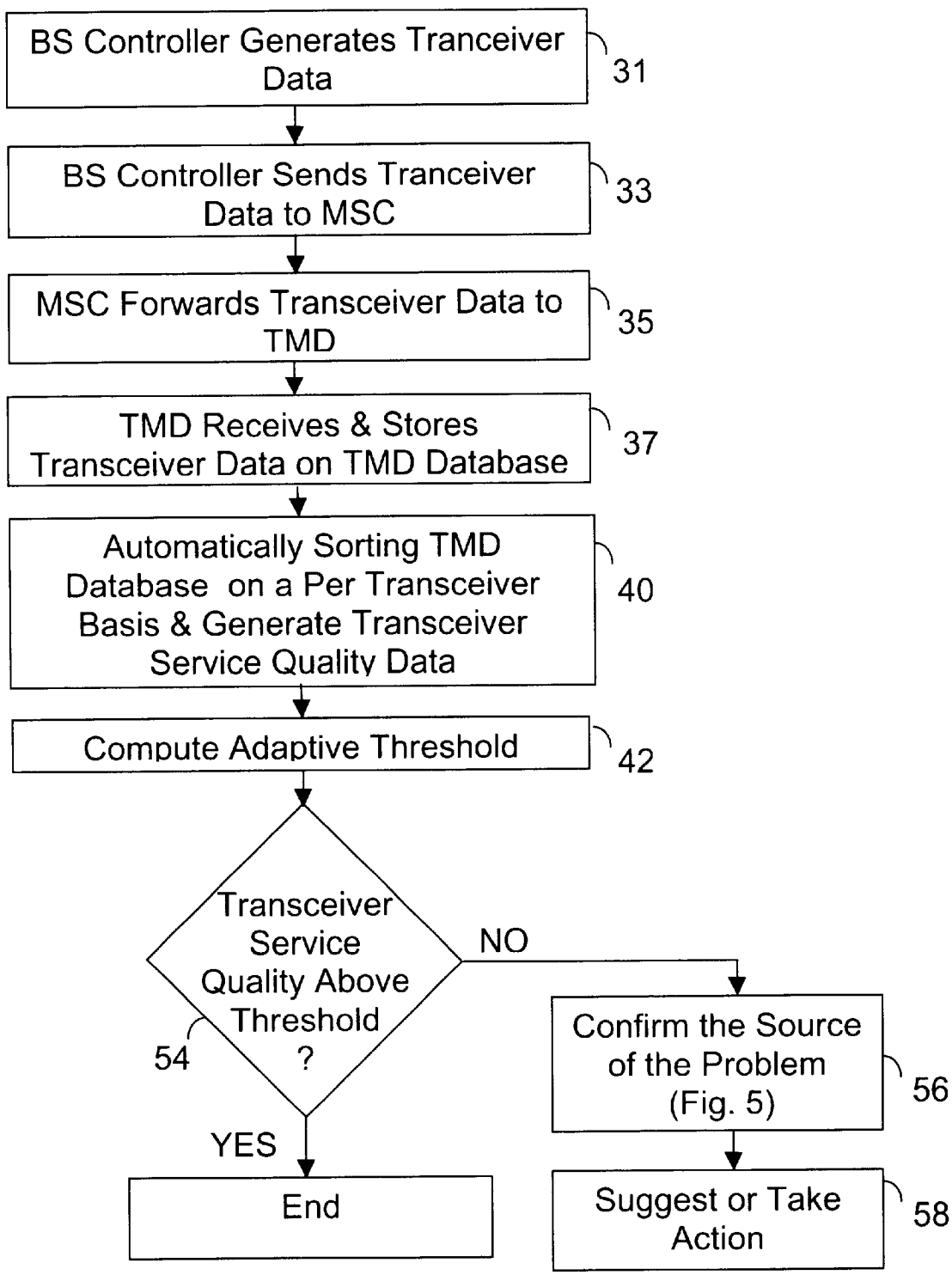
FIG. 3 is a flowchart of the exemplary preferred embodiment of the invention.

Reference is further made to FIG. 3, which illustrates, in conjunction with FIG. 2, an exemplary preferred embodiment of the present invention. FIG. 3 represents an exemplary flowchart of the invented method which provides an automatic method for sorting the TMD database 25a and automatically detecting a malfunctioning BS transceiver based on an adaptive calculation of a performance threshold. According to the preferred embodiment of the invention, the threshold is adaptively calculated on the basis of the current performance of a plurality of transceivers selected from a particular portion of a location area. Therefore, as a consequence of the invented method, a particular transceiver will only be tagged as malfunctioning if its performance is lower, or lower by a certain amount, than the performance of its pairs. In action 31, the BS controller or the particular transceivers themselves generate transceiver performance data based on the measurements described hereinbefore. The BS controller further sends the data to the cooperating MSC 22, action 33, and the MSC 22 forwards the data to the TMD 25, action 35. Upon receipt of the transceiver performance data, the TMD 25 stores the data on the TMD database 25a, action 37, for subsequent analysis. In action 40, the TMD database 25a is automatically sorted on a per transceiver basis, so that statistics related to the performance level of each active transceiver are generated. Typically, a BS 18 comprises a fixed number of transceivers, such as for example 19 transceivers, each one of these transceivers being assigned a number of operational frequencies or channels, which are used for the radio communications with the MSs 12–16. Therefore, when sorting the database 25a, data related to each transceiver's performance is considered and analyzed. The data related to the transceivers' performance received and stored in the TMD database 25a may contain call accessibility data (call set-up failure rate, the call setup time, etc), call reliability data (the BER, the FER, the signal strength, timing information etc.) and/or call retainability data (the hand-off failures rate, the rate of dropped calls, etc). The data is sorted on a per transceiver basis and statistics for each transceiver is generated. In the preferred embodiment of the invention, transceivers from the same BS 18 serving the same cell, can be analyzed. However, those skilled in the art will notice that other sets of transceivers could also be monitored, such as all transceivers within an MSC service area, or a portion thereof. According to the preferred embodiment of the invention, the transceiver individual statistics contain a service quality value which is representative of the service performance level of each transceiver. Various methods may be employed for producing the service quality value. In the preferred embodiment of the invention, a function of at least one parameter, but preferably of a plurality of parameters from the set of parameters sent by the transceiver 19 is used. The function may thus be computed using at least one, but preferably a plurality of the measurements and parameters generated by the base station 18 or the mobile stations 12–16. Typically, it is a combination of at least two of those parameters and measurements, which is used by the function in order to issue the service quality value for each transceiver. The service quality value issued for one transceiver is therefore representative of the service performance level of that transceiver for a given period of time, such as for example for a pre-selected period of time, by computing parameters measured over that given period of time, or alternatively can be representative of the instant service performance level of a transceiver, if the measurements time interval is minimized.

Once the statistics for each transceiver's performance level are computed and the service quality value generated for each base station transceiver, an adaptive threshold service value is further calculated (action 42).

Figure 4A:
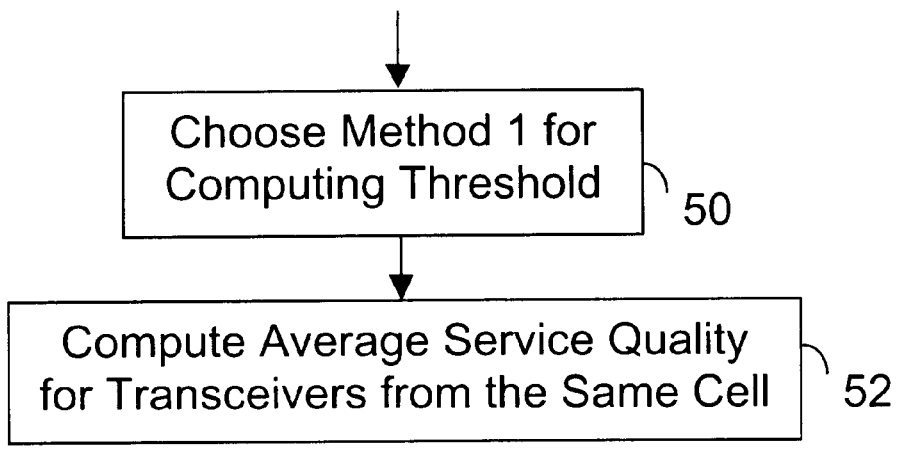
FIG. 4a is a flowchart illustrating a first variant of the exemplary preferred embodiment of the invention.
Figure 4B:
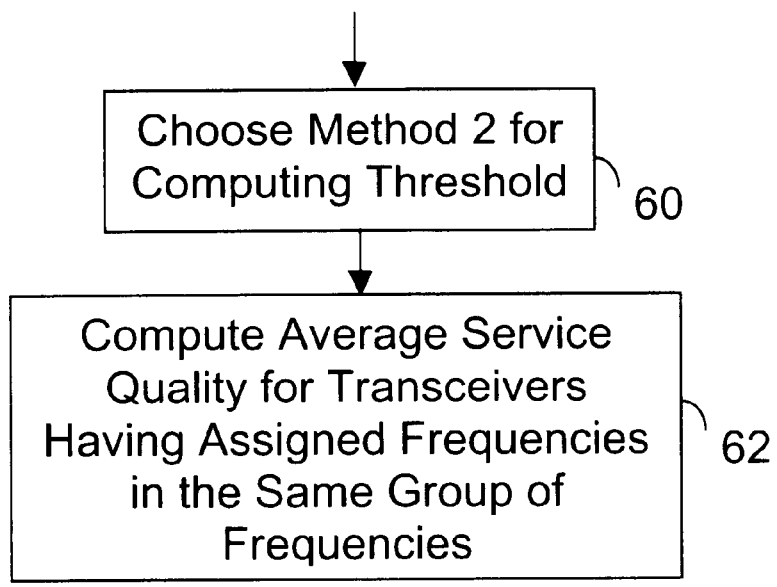
FIG. 4b is a flowchart illustrating a second variant of the exemplary preferred embodiment of the invention.

FIGS. 4a and 4b better show two possibilities for computing the adaptive threshold service value according to the preferred embodiment of the present invention. Reference is first made to FIG. 4a, wherein there is shown a first variant according to the preferred embodiment of the invention for computing the threshold service value which is indicative of the minimum acceptable service quality of a transceiver of the BS 18. First, in action 50, a method is chosen for computing the threshold service value. In FIG. 4a, the chosen method is the one that takes into account all transceivers within the same BS (or cell) for computing an average performance level which will be a parameter used for further computing the adaptive threshold representing the minimum acceptable performance level. According to this first method, a plurality of transceivers from the same BS, preferably all transceivers from the same BS, are considered for calculation. An average of the service quality value of those transceivers is calculated, action 52, based on the transceiver performance data sorted in the TMD database 25a, or based on the already calculated service quality value of each transceiver, described in action 40. In a variant of the preferred embodiment of the invention, this average value may further be adjusted by a security factor in order to avoid that too many or too few, maybe none, malfunctioning transceivers will be detected, and the threshold service value is so generated.

Those skilled in the art will understand that various combinations of transceivers from a service area, but preferably all transceivers within a BS 18, may be used for computing the threshold service value representing the minimum acceptable performance level of one transceiver. Furthermore, as it will be also apparent to the persons skilled in the art, for allowing consistent comparison between the threshold service value and the service quality value of each transceiver, the same function involving the same type of parameters shall be used for computing both types of value. However, the combination of parameters to be used for the function can be chosen by the network operators in order to achieve the most reliable detection of malfunctioning transceivers given the local configuration of the cellular telecommunications network 10.

Reference is now made to FIG. 4b, wherein there is shown a variant of the preferred embodiment of the invention related to a second method for computing the transceiver performance threshold. According to this variant, the second method is chosen for computing the transceiver performance threshold, action 60. Then, in action 62, which corresponds to the above-described action 52, a number of transceivers having assigned frequencies in the same group of frequencies, such as co-channel frequencies, is considered for computing a transceivers average performance that may be further modified and used for generating the transceiver performance threshold value. According to this variant of the preferred embodiment of the invention, only transceivers having assigned essentially similar frequencies are considered for the calculation of the transceivers average performance. This is believed to improve the detection of the transceivers which faults are not related to frequency interference, such as the frequency overlapping due to cell planning problems. According to this method, malfunctioning transceivers are more likely to be detected since this method focuses on the detection of malfunctions due to hardware or software problems while reducing detection of frequency interference-related malfunctions. As those skilled in the art will notice, the frequency interference malfunction typically affects all transceivers that operate within the same range of frequencies. Thus, if transceivers operating within the same group of frequencies, therefore having essentially similar frequencies, are chosen for computing the transceiver performance threshold value, when comparing the performance threshold value with the transceiver performance value of each transceiver, the detection of the malfunctions due to frequency interference is inhibited while the detection of hardware and software malfunctions is accentuated.

Reference is now made back to FIG. 3, wherein in action 54, the transceiver service quality value of each transceiver being considered is compared with the threshold service quality value. This comparison may be a strict comparison, wherein if the transceiver service quality value does not exceed the adaptive threshold value, then that transceiver is flagged as being malfunctioning. Alternatively and preferably, one transceiver may be flagged as being malfunctioning only in the case wherein the transceiver service quality value is less than the threshold performance value by a certain amount (the transceiver performance is much less than the transceivers average performance, therefore indicating that the particular faulty transceiver has abnormally low performance with respect to the transceivers' average performance).

Figure 5:
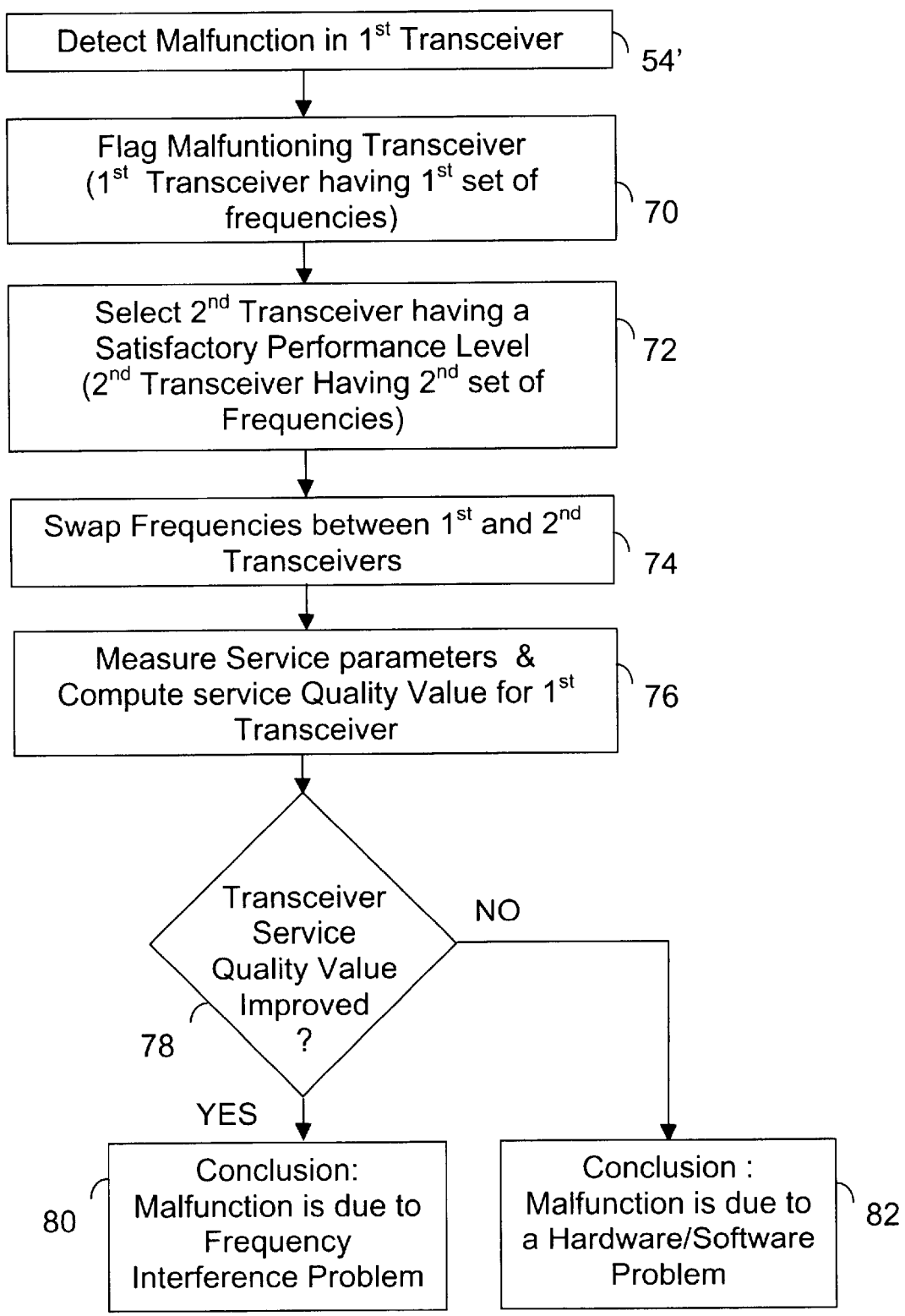
FIG. 5 is a flowchart illustrating a further embodiment of the invention related to the method for confirming the cause of a base station transceiver malfunction.

According to a further embodiment of the invention, action 56 is optionally but preferably executed, and is directed to a confirmation of the transceiver problem, once a malfunction is detected for a particular transceiver as in action 54. Reference is now made to FIG. 5 which describes in greater detail the action 56 of FIG. 3. According to this further embodiment of the invention, when a particular first transceiver is detected as malfunctioning, action 54', it is first flagged as malfunctioning, action 70, but no other action is yet taken, such as turning the transceiver off. Instead, a confirmation of the source of the malfunction is searched. The transceiver malfunction can typically occur because of two reasons: i) a hardware or software problem within the transceiver or, ii) a frequency interference problem due to the cell planing scheme. However, network operators in charge of the BS transceivers' performance often want to detect only the first type of problem related to the transceiver internal malfunction. Therefore, in order to confirm that the initially detected malfunction is actually due to a software or hardware problem, according to this further embodiment of the invention a second transceiver is selected, action 72, the second transceiver having a satisfactory performance level as detected in action 54. Those skilled in the art will notice that each transceiver has a number of assigned channels. Then, in order to confirm the source of the first transceiver's malfunction, according to the invention, the set of frequencies of the second transceiver is assigned to the originally malfunctioning, action 74. Next, an additional set of measurements is taken, action 76, on at least one of the uplink and the downlink radio paths of the initially malfunctioning transceiver, as described hereinbefore. The service quality value is again computed in the same manner as in action 40, and compared with either the threshold service value or the initial service quality value of that transceiver, as computed before the frequency swap, in order to detect if any change occurred after the frequency swap, action 78. In the case wherein the service quality value of the first transceiver improved after the re-assignment of frequency channels, it is concluded that the initial malfunction was due to a frequency interference, action 80, since the transceiver performance changed after the assignment of a new frequency. In the opposite case, wherein the service quality value does not change after the frequency change, it is concluded that the malfunction is due to a hardware or software problem within the transceiver, action 82, and in that case, the malfunctioning transceiver is confirmed as having a software or hardware internal problem.

As those skilled in the art will notice, it is believed that this method for confirming the source of a malfunction within a BS transceiver 19i may be employed following a detection of a possible transceiver malfunction as disclosed according to the preferred embodiment of the present invention, with any other method for detecting a BS transceiver malfunction, wherein transceiver performance data for at least two transceivers is available.

Reference is now made back to FIG. 3, wherein once a problem of a particular transceiver is detected, action 54 with result NO, and optionally confirmed in action 56, the system can automatically suggest or take an action, action 58. This action may be defined by the network administrators, and may comprise suggesting to turn off the particular malfunctioning transceiver for a limited period of time, simply turning off the transceiver indefinitely, only providing the listing of the malfunctioning transceivers to the network administrator, or any other action as believed appropriate for a particular cellular telecommunications system.

In the preferred embodiment of the invention, once a particular transceiver is turned off, action 58, it may be automatically or manually turned back on, (action not shown), on the basis of further analysis of the above-mentioned parameters, may the transceiver performance improve over time, after the fixing of the transceiver, or once the traffic load decreases.

In action 58, when an action is either taken or suggested automatically, such as turning off a particular faulty transceiver, a protection mechanism may be further provided according to the preferred embodiment of the invention. Such mechanism may inhibit the turning off of the transceiver in case wherein too many transceivers are to be turned off, or if the traffic load is too intense. The mentioned mechanism acts as a safety measure for avoiding to turn off too many transceivers at a time, so that cellular service keeps to be provided to cellular subscribers in a particular cell, although the quality of the service may be diminished.

Reference is now made back to FIG. 2, which illustrates an actual exemplary physical implementation of the invention within the cellular telecommunication network 10. The MSs 12, 14, and 16 sustain communications with the BS 18 as it is well known in the art. During these communications, measurements are taken and the same parameters are calculated within the BS transceivers 19$i$, as described hereinbefore. The transceivers 19$i$ send the measurements and parameters toward the MSC 22, which in turn forwards them to the TMD 25. Upon receipt at the TMD 25, the data passes through a TMD I/O interface 90 that manages the TMD incoming and outgoing data. The I/O interface forwards the data to the TMD database 25$a$, where the measurements and parameters regarding the transceivers' performance are stored. In real-time, quasi-real time or periodically, the measurements and parameters stored on the database 25$a$ are collected by a Service Quality Value Generator Module 92 and sorted on a per transceiver basis, and a service quality value representative of the performance level of an individual transceiver is generated for each such transceiver. The service quality values of the considered transceivers are then preferably input in the Service Quality Threshold Value Generator Module 94 which calculates a service quality threshold value proportional to the average of the service quality values of the considered transceivers. Thus, the threshold that is to be used for detecting malfunctioning transceivers directly depends on the average performance of the considered transceivers. Once the service quality threshold value is calculated, both the service quality threshold value and the service quality Value of a particular transceiver are input in the Comparison Module 95, wherein a comparison is performed between the two values. Preferably, a sequence of comparisons can be performed between the service quality threshold value and a series comprising each service quality value of each transceiver considered for the malfunction detection. In particular, for each transceiver, the Comparison Module 95 compares the service quality value of that transceiver with the service quality threshold value, and issues the result of the comparison: if the service quality value of the transceiver is greater than the service quality threshold value, then that transceiver is considered to be sufficiently efficient. If the service quality value is lower than the threshold value, than that particular transceiver is considered to be malfunctioning, and is tagged as a malfunctioning transceiver.

As expressed hereinbefore, alternatively the comparison performed by the Comparison Module 95 may not be a strict comparison, but rather includes a safety factor added or subtracted to or from either the Threshold Value or the Service Quality Value, thus allowing detection of malfunctioning transceivers which Service Quality Value is lower than the Threshold Value by a certain amount, rather than being strictly lower.

The Confirmation Module 96 further performs a detection of the source of the transceiver malfunction originally detected by the Comparison Module 95, according to a further embodiment of the invention described hereinbefore. Once a particular transceiver is detected as being malfunctioning, and tagged accordingly, the Confirmation Module 96 will assess the source of the malfunction by differentiating between a malfunction due to a hardware/software-type of problem and a malfunction due to a frequency interference-type of problem. The Confirmation Module 96 receives the data related to a particular malfunctioning transceiver, the data comprising at least the service quality value calculated by the Service Quality Value Generator 92 for that transceiver, the identification of that transceiver, and the identification of the frequency channels used by that transceiver. Moreover, for the purpose of the confirmation of the malfunction, the Confirmation Module 96 also receives from the Service Quality Value Generator 92, either through the Comparison Module 95 or directly (link not shown), the same type of data relating to a second transceiver having an adequate performance. Then, the Confirmation Module 96 swaps the frequency channels between the two transceivers, therefore assigning the set of frequencies originally assigned to the second transceiver (sufficiently efficient) to the first transceiver (originally malfunctioning). The instruction for swapping the sets of frequencies is transmitted from the Confirmation Module 96 of the TMD 25 through the MSC 22 to the BS 18, which actually re-assigns the frequencies to the transceivers accordingly. New measurements are taken for the originally malfunctioning transceiver in the same manner as described hereinbefore but with the new frequency configuration, and the BS 18 calculates the same type of parameters which are returned to the TMD 25. More particularly, the new measurements and parameters are input to the Service Quality Value Generator 92, which re-calculates the Service Quality Value for the originally malfunctioning transceiver. A new comparison is made between the original Service Quality Value and the new Service Quality Value of that transceiver, preferably within the Confirmation Module 96. If the Service Quality Value of the originally malfunctioning transceiver improved, i.e. is greater than the original Service Quality Value, then it is concluded that the original malfunction was due to a frequency interference. If not, it is concluded that the original malfunction was due to a hardware/software problem.

It is to be noted that the Service Quality Value Generator 92, the Service Quality Threshold Value Generator 94, the Comparison Module 95 and the Confirmation Module 96 may be separate entities, such as for example separate processors or separated application programs, logic functions included in the same processor or in the same application program, or any other type of suitable entities capable of performing the functions described hereinbefore.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a cellular telecommunications system, a method for detecting malfunctions of base station transceivers, the method comprising the steps of:

a) sorting information relating to a plurality of base station transceivers on a per transceiver basis and generating a service quality value for each one of said plurality of base station transceivers, said service quality value being representative of a performance level of each one of said plurality of transceivers;

b) computing a service quality threshold value through a function generating a result proportional to an average performance level of said plurality of transceivers, using said information relating to said plurality of transceivers; and c) for at least one particular transceiver from said plurality of transceivers, comparing said service quality value with said service quality threshold value for determining the acceptability of said performance level of said particular transceiver.

2. The method claimed in claim 1, wherein in step a):
   the information sorted covers a pre-selected period of time;
   each said service quality value is representative of the performance level of one transceiver for said preselected period of time; and the service quality threshold value is representative of an average performance level of said plurality of transceivers over said pre-selected period of time.

3. The method claimed in claim 1, further comprising after the step of comparing a step of:
   d) upon determining that said service quality value of said particular transceiver is lower than said service quality threshold value, confirming the malfunction of said particular transceiver.

4. The method claimed in claim 3, wherein said first transceiver is assigned a first set of frequency channels and wherein step d) comprises the steps of:
   selecting a second transceiver having assigned a second set of frequency channels, said second transceiver appearing to be properly functioning,
   assigning the second set of frequency channels to the first transceiver; and
   detecting if the first transceiver persists malfunctioning, whereby when the first transceiver persists malfunctioning the most probable cause of the malfunction is one of a hardware problem and a software problem and when the first transceiver stops malfunctioning the most probable cause of the malfunction is a frequency interference.

5. The method claimed in claim 4, wherein in the step of detecting if the first transceiver persists malfunctioning, a function is computed, said function using at least one parameter selected from a set of parameters comprising bit-error-rate (BER), rate of dropped calls, Frame Erasure Rate (FER), hand-off failure rate, call set-up failure rate, call set-up time and signal strength of said first transceiver.

6. The method claimed in claim 4, wherein said first and second transceivers belong to one base station.

7. The method claimed in claim 4, wherein each one of said first and second sets of frequency channels comprise only one frequency channel.

8. The method claimed in claim 1, further comprising after the step of comparing a step of:
   d) upon determining that said service quality value of said particular transceiver is lower than said service quality threshold value, automatically taking an action.

9. The method claimed in claim 8, wherein said action is to automatically turn off said at least one transceiver.

10. The method claimed in claim 1, further comprising after the step of comparing a step of:
    d) upon determining that said service quality value is lower than said service quality threshold value, automatically suggesting an action to be taken by a network administrator.

11. The method claimed in claim 1, wherein said plurality of base station transceivers are located within one base station.

12. The method claimed in claim 1, wherein said information relates to at least one of call accessibility data, call reliability data and call retainability data.

13. The method claimed in claim 1, wherein said service quality value and said service quality threshold value are computed using a function involving at least one parameter selected form the set of parameters comprising bit-error-rate (BER), rate of dropped calls, Frame Erasure Rate (FER), hand-off failure rate, call set-up failure rate, call set-up time and signal strength of said at least one transceiver.

14. The method claimed in claim 1, wherein each one of said plurality of transceivers belong to the same group of frequencies, whereby each transceiver from said plurality of transceivers which performance data is used for computing the service quality threshold value is so chosen to reduce frequency-related malfunctions, while still allowing detection of non-frequency related malfunctions.

15. In at least one node of a cellular telecommunications system, a transceiver malfunction detector for detecting malfunctions occurring in transceivers of at least one base station of said system, said transceiver malfunction detector comprising:
    at least one database for storing information relating to a service performance of a plurality of base station transceivers;
    means for generating a service quality value for each one of said plurality of transceivers by sorting said information on a per transceiver basis, each said service quality value being representative of a performance level of one transceiver;
    means for generating a service quality threshold value proportional to an average of the service quality values of said plurality of transceivers; and
    means for comparing said service quality value of at least one transceiver from said plurality of transceivers with said service quality threshold value for determining the acceptability of said performance level of said at least one transceiver.

16. The transceiver malfunction detector claimed in claim 15, wherein said plurality of transceivers and said one transceiver are located within the same base station.

17. The transceiver malfunction detector as claimed in claim 15, wherein said information relates to at least one of call accessibility data, call reliability quality data and call retainability data of said plurality of transceivers.

18. The transceiver malfunction detector as claimed in claim 15, wherein said means for generating a service quality value and said means for generating a service quality threshold value use a function of at least one parameter for generating said service quality value and said service quality threshold value, said at least one parameter being selected from a set of parameters comprising bit-error-rate (BER), rate of dropped calls, Frame Erasure Rate (FER), hand-off failure rate, call set-up failure rate, call set-up time and signal strength of said at least one transceiver.

* * * * *